Nov. 3, 1931.  V. G. APPLE  1,830,310
ELECTRIC DRIVE FOR JUVENILE AUTOMOBILES
Filed June 14, 1928
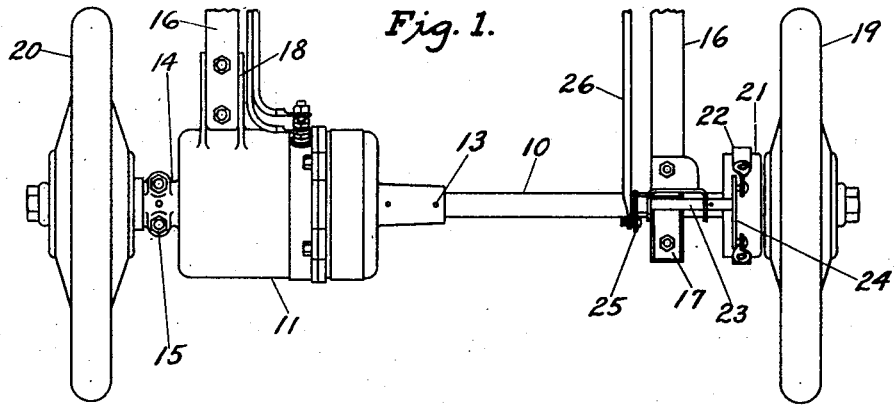
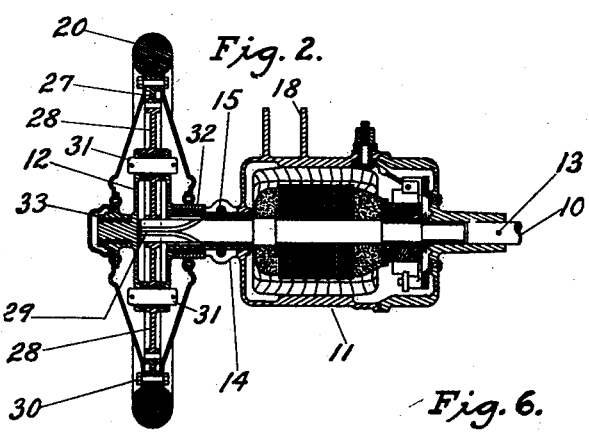
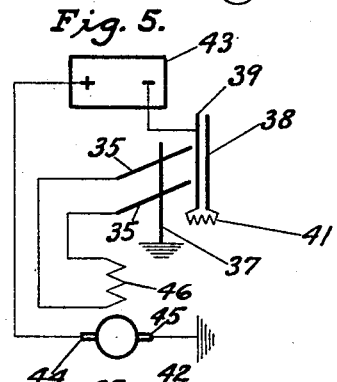
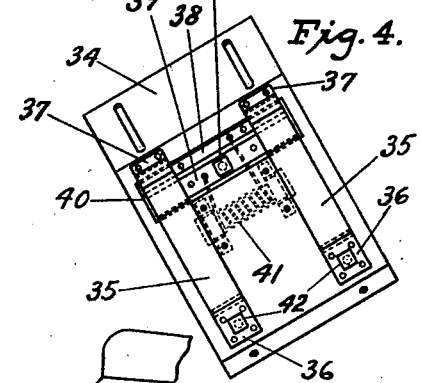
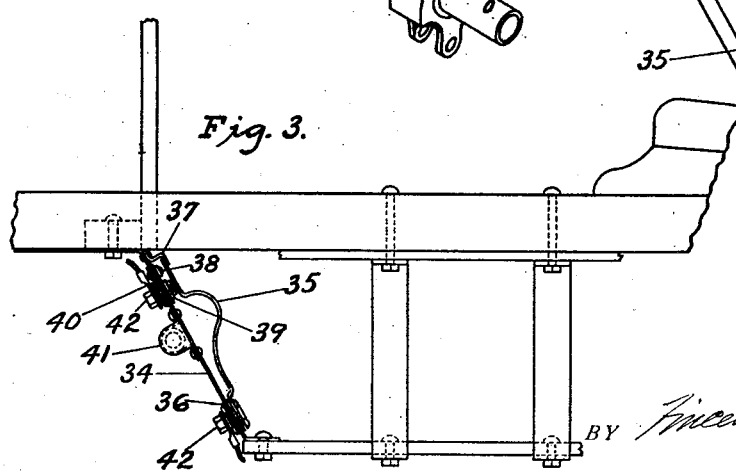
INVENTOR
Vincent G. Apple Patented Nov. 3, 1931

1,830,310

UNITED STATES PATENT OFFICE

VINCENT G. APPLE, OF DAYTON, OHIO

ELECTRIC DRIVE FOR JUVENILE AUTOMOBILES

Application filed June 14, 1928. Serial No. 285,374.

My invention relates to improvements in electric drives for juvenile automobiles wherein a battery is employed to operate an electric motor, a suitable control device being interposed therebetween, the motor being connected thru reduction gearing to one of the wheels.

One of the objects of my invention is to provide a simple structure of few parts which may be produced at the low cost necessary to its application.

Another object is to provide a structure which is safe for juvenile use by an arrangement wherein the moving parts are neither exposed nor readily accessible.

Another object is to provide, within the cost permitted by the use to which it is to be put, a system of control giving high and low speed forward and reverse.

I attain these objects by the mechanism illustrated in the accompanying drawings, wherein—

Fig. 1 is a plan view of the axle with motor built in.

Fig. 2 is a longitudinal horizontal cross section thru the motor and driven wheel.

Fig. 3 is a side view of the control mechanism.

Fig. 4 is a plan view of the control mechanism.

Fig. 5 is a diagram of the circuit.

Fig. 6 is a perspective view of the idler gear carrier.

Similar numerals refer to similar parts thruout the several views.

The axle proper is composed of three main parts, namely, the axle shaft 10, the motor housing 11 and the idler gear carrier 12, these parts being all secured together in axial alignment. A pin 13 permanently joins shaft 10 and housing 11. Hub 14 of housing 11 is split horizontally, and bolts 15 clamp together the split parts of the hub to securely hold carrier 12 both against endwise movement as well as against rotation relative to housing 11.

The entire axle when thus assembled is held against rotation by the means employed to connect the axle to the body of the car. The means here shown consists of two single leaf cantilever springs 16, one of which is bolted to a bracket 17 directly on the axle, the other being bolted to a bracket 18 extending from the motor housing 11.

The axle then is stationary thruout its entire length, the wheels 19 and 20 being adapted to rotate freely thereon. Wheel 19 is provided with a brake drum 21, a brake band 22, actuated thru shaft 23, levers 24 and 25, and by rod 26 supplies the braking means. The other wheel 20 contains and encloses the entire speed reducing mechanism comprising a ring gear 27, two idler gears 28 and a pinion 29 on the motor shaft.

Ring gear 27 is concentrically supported by bolts 30 in wheel 20 and is revolvable therewith. Idler gears 28 on studs 31 held in carrier 12 connect pinion 29 to ring gear 27, thus providing the desired speed rotation between the motor and wheel 20, and stationary journals on carrier 12 provide bearings around which wheel hubs 32 and 33 revolve.

A simple and inexpensive control means is provided as shown in Figs. 3 and 4, the connections thereto being shown diagrammatically in Fig. 5, whereby a high and low speed may be had either forward or reverse.

The base plate 34 is of sheet metal and is grounded so as to make connection thru to the motor housing. Two pedal strips 35 of conductive material are riveted to base plate 34 but insulated therefrom by fibre pieces 36.

The pedal strips 35 are preferably of spring stock and tensioned to spring upward so that in their inoperative position their free ends bear against the metal shelves 37 which are riveted directly to base plate 34 and therefore grounded. Contact strips 38 and 39 are riveted to base plate 34 but insulated therefrom by fibre strips 40. Pedal strips 35 are so curved that when pressed downward they will make contact first with strip 38 but when pressed harder will flatten out somewhat and contact also with strip 39. A resistance coil 41 connects strip 38 to strip 39. Binding posts 42 are provided, one for each pedal strip 35 and one for contact strip 39.

Contact strip 39 is connected thru a binding post and cable to one of the terminals of battery 43, while pedal strips 35 are connected thru binding posts and cables, one pedal strip to each end of the field winding 46. The other terminal of battery 43 is connected to brushes 44 of one polarity, the brushes 45 of opposite polarity being grounded.

The simplicity and safety of the controller in operation is apparent, since when both pedals are up both ends of the field winding are grounded, but there is no connections thru to the battery. If, inadvertently, both pedals are pressed down at the same time, both ends of the field winding are connected to the battery but there is no ground connection to complete the circuit. To operate the motor, one pedal must be down and the other up, and whichever pedal is down determines the direction of the current thru the field winding and consequently the direction or running. Light pressure of a pedal contacts with strip 38 and the circuit is thru resistance 41 giving low speed. Heavier pressure contacts also with strip 39 are therefore cuts resistance 41, from the circuit giving the higher speed.

While I have shown a grounded circuit, it is apparent that, if desired, shelves 37 may be insulated from base plate 34, and that brushes 45 may be also insulated, and if then shelves 37 were connected by wire to brushes 45 the ground would be eliminated from the circuit. It is also apparent that motor elements could be exchanged in this circuit, the armature being placed where the field is shown and vice versa. If desired, with little change, the control may be so arranged as to provide two speeds forward but only one reverse by covering or cutting away one of the contact strips 38 or 39 at the point where the reverse pedal makes connection therewith. By arranging one pedal to prevent contact with strip 39, but allowing contact with strip 38, backing at high speed may be prevented. Switches or pedals of other forms than those shown may be employed and other changes made, so long as they do not fall outside the scope of the invention as defined in the following, wherein I claim—

1. Electric driving apparatus for a juvenile automobile comprising, an electric motor, an axle shaft non-rotatably secured in the hub of said motor at one end, a wheel free to revolve at the outer end of said shaft, a gear carrier non-rotatably secured in the hub of said motor at the other end, said gear carrier comprising two axially spaced apart wheel journals with space for gearing therebetween, gearing in said space adapted to be driven by said motor, and a wheel in two parts each part having a bearing on one of said journals, and the two parts being adapted to enclose said gearing and be rotated thereby.

2. Electric driving apparatus for a juvenile automobile comprising, an electric motor, a motor hub at each end of said motor, an axle shaft non-rotatably secured in the outer end of one of said motor hubs, a wheel rotatably supported on the outer end of said axle shaft, a gear carier comprising two axially spaced apart carrier hubs and radial arms, an idler gear rotatably supported at the outer ends of said radial arms and between said carrier hubs, means to non-rotatably secure one of said carrier hubs in the other said motor hub, an armature shaft rotatably supported in said motor hubs and having one end extending through one one of said carrier hubs into the space between the carrier hubs, a pinion on the extended end of said armature shaft engaging said idler gear, and a hollow wheel comprising two spaced apart discs, each having a bearing on one of said carrier hubs, and an internal ring gear secured to said wheel between said discs and in engagement with said idler gear.

In testimony whereof I hereunto set my hand.

VINCENT G. APPLE.